April 19, 1960 J. E. BECKER 2,932,950
REVERSIBLE FLUID COUPLINGS
Filed June 20, 1958 2 Sheets-Sheet 1
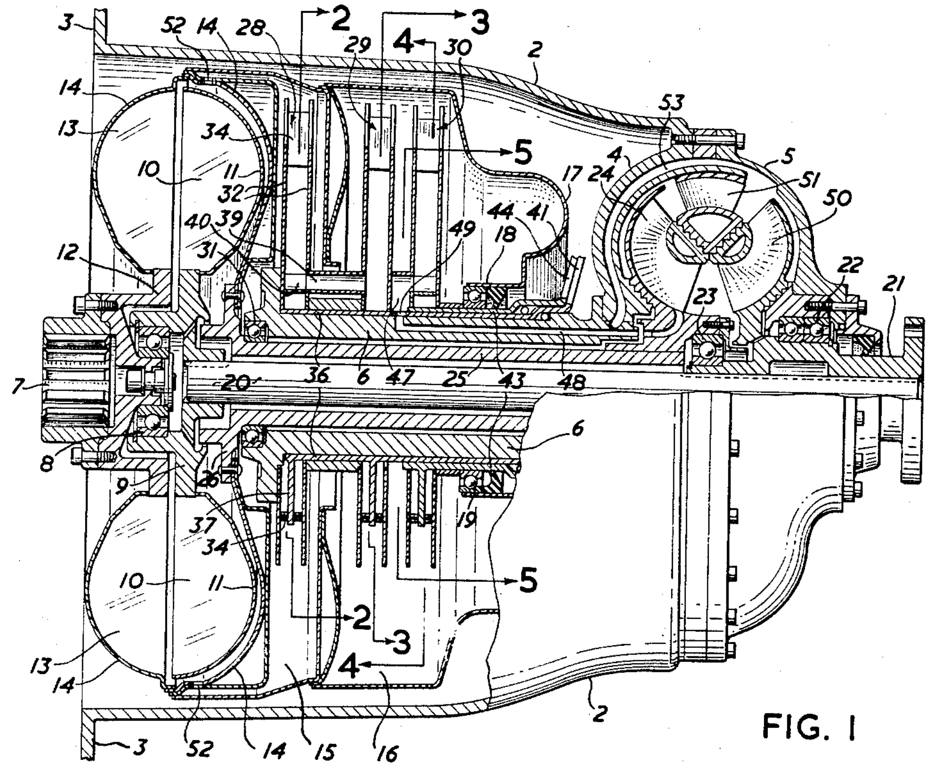
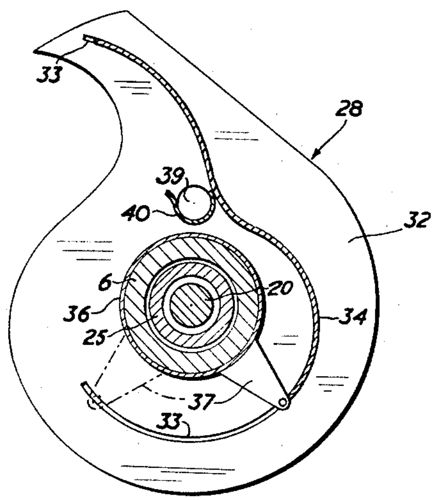
INVENTOR
JOHN E. BECKER
BY: [signature]
ATTORNEY April 19, 1960 J. E. BECKER 2,932,950
REVERSIBLE FLUID COUPLINGS
Filed June 20, 1958 2 Sheets-Sheet 2
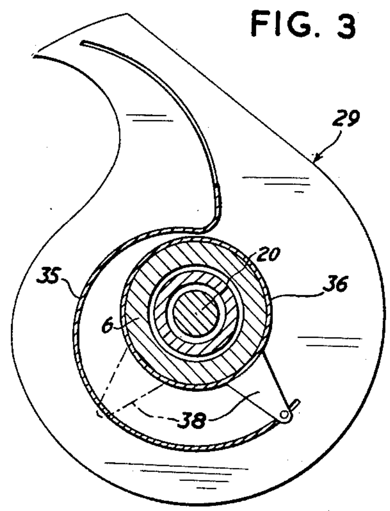
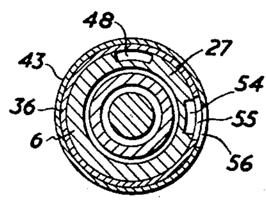
FIG. 5
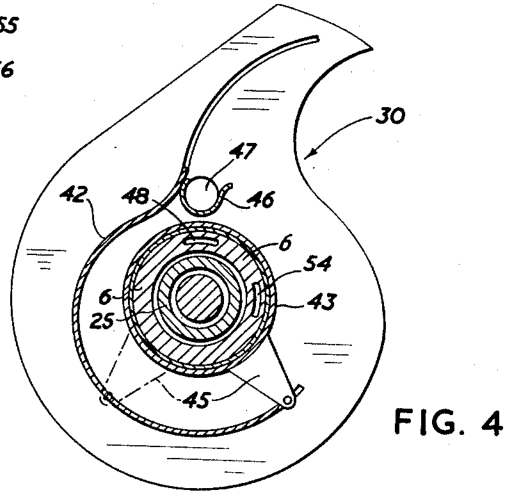
FIG. 4
INVENTOR
JOHN E. BECKER
BY: [signature]
ATTORNEY United States Patent Office 2,932,950 Patented Apr. 19, 1960

2,932,950

REVERSIBLE FLUID COUPLINGS

John E. Becker, Darlington, Ontario, Canada

Application June 20, 1958, Serial No. 743,417

8 Claims. (Cl. 60—54)

My invention relates to improvements in reversible fluid couplings and the purpose of this invention is to provide a coupling particularly suited for marine use wherein it constitutes the driving transmission between engine and propeller, manual regulation of the fluid flow in the transmission providing an indefinite range of forward and reverse propeller speeds.

A further object of the invention is to provide a transmission incorporating two couplings, one coupling being for forward drive and the other for reverse, together with an annular fluid reservoir which rotates with the couplings, the fluid being transmitted from the couplings to the reservoir and vice versa by the use of a plurality of fluid scoop ribbons as disclosed in my United States Patent No. 2,627,167, issued February 3, 1953.

With the foregoing and other objects in view as shall hereinafter appear, my invention consists of a reversible fluid coupling constructed and arranged all as hereinafter more particularly described and illustrated in the accompanying drawing in which:

Fig. 1 is a longitudinal cross-sectional view through the transmission assembly.

Fig. 2 is a transverse cross-sectional view taken through the line 2—2, Fig. 1.

Fig. 3 is a transverse cross-sectional view taken through the line 3—3, Fig. 1.

Fig. 4 is a transverse cross-sectional view taken through the line 4—4, Fig. 1, and Fig. 5 is a transverse cross-sectional view taken through the line 5—5, Fig. 1.

The complete transmission assembly is supported by a housing 2 formed with a flange 3 at its forward end and which is adapted to be bolted to the fly wheel housing of an engine (not shown) and by which arrangement the entire transmission is supported by the engine fly wheel housing, an important feature in providing simplicity of assembly. The rear end of the housing 2 is bolted to and supports the housings 4 and 5 which encase the reverse coupling as shall be hereinafter described. A stationary sleeve 6 is bolted to the central portion of the housing 4 to extend forwardly and support the fluid scoop ribbon assemblies, which arrangement shall be also hereinafter described.

A splined socket 7 in the forward end of the transmission is adapted to be secured to the rear end of the driving shaft of the engine (not shown) and is rotatably mounted within a ball bearing 8 and upon which bearing a hub 9 is also rotatably mounted, the hub carrying a plurality of radial turbine vanes 10 mounted within a runner housing 11. A hub 12 freely surrounding the hub 9 is bolted to the socket 7 and carries a plurality of radial impeller or pump vanes 13, secured within an impeller 14 attached to the hub 9 and in which the turbine vanes 10 and their runner 11 are also contained for rotation therein.

The impeller housing 14 is connected at its periphery to a fluid chamber 15 and to which a rotatable fluid reservoir 16 is attached, the rear curved wall 17 of the reservoir being formed with an inwardly directed sleeve 18 mounted for rotation upon a ball race 19. The hub 9 upon which the runner housing 11 is mounted is secured to the forward end of the transmission shaft 20 which at its rear end is splined in a sleeve 21 rotatably contained within a ball race 22 mounted within the housing 5. This sleeve also carries a ball race 23 upon which a vaned impeller assembly 24 is mounted within the housing 4, the impeller assembly being secured to the rear end of a sleeve 25 surrounding the transmission shaft 20 and formed at its forward end with a flange 26 which is peripherally attached to the inner surrounding portion of the impeller housing 14.

The sleeve 25 is surrounded by the stationary sleeve 6 and upon which three fluid scoop ribbon assemblies are mounted, one assembly 28 being contained within the fluid chamber 15 and the other two assemblies 29 and 30 contained within the fluid reservoir 16. The forward end of the sleeve 6 is mounted upon a ball race 31 encircling the forward end of the sleeve 25, the rear end of the sleeve being attached to the housing 4. The three fluid scoop ribbon assemblies are similar to each other in construction and operation and of the type disclosed in my United States Patent No. 2,627,167.

Referring to Fig. 2, which is a transverse section through the fluid scoop ribbon assembly 28, this assembly, in common with the other two, comprises a pair of transversely arranged parallel side plates 32 of preferably the general shape as shown in the figure. The plates of this assembly are supported by the inner end of the stationary sleeve 6 which protrudes into the fluid chamber 15. The opposite faces of the plates contain a pair of similar curved grooves 33 which are positioned opposite one another to constitute a track containing a slidable scoop ribbon 34 which extends between the slides within the grooves. As the fluid chamber 15 rotates in a counter-clockwise direction the outer ends of the track grooves are curved towards the counter-clockwise direction for fluid scooping efficiency, the inner ends of the track grooves being curved concentrically of the sleeve 6 and along which the ribbon is drawn by a rotatable sleeve and axial swinging arm arrangement as described in the following paragraph. The similar fluid scoop ribbon assemblies 29 and 30 are also supported by the stationary sleeve 6 and are both contained within the fluid reservoir 16 which rotates in unison with the impeller housing 14 and fluid chamber 15.

The ribbons 34 and 35 of the fluid scoop assemblies 28 and 29 are arranged to slide in unison in opposite directions, i.e. when one ribbon is being extended the other is being retracted and vice versa, and to attain this action a turnable sleeve 36 is mounted upon the stationary sleeve 6 and carries a pair of radial arms 37 and 38 to which the inner ends of the ribbons 34 and 35 are respectively attached. Upon reference to Fig. 2 it will be seen that the inner ends of the grooves 33 of the assembly 28 are curved in a clockwise direction while the grooves of the assembly 29 are curved in a counter clockwise direction and whereby partial rotation of the sleeve will extend one ribbon and retract the other.

To provide a fluid transfer between the two assemblies a conduit 39 extends therebetween. In the space between the side plates 32 of the assembly 28 a shell plate 40 is contained, and shaped to direct scooped fluid into the conduit 39 and from where it passes into the assembly 29. The sleeve 36 for actuating the ribbons 34 and 35 is turnable in any suitable manner, such as by a shift lever 41 extending from its outer end through a suitably positioned orifice in the housing 2.

For actuation of the ribbon 42 of the assembly 30 a turnable sleeve 43 is mounted upon the sleeve 36 and which may be actuated by a shift lever 44 similarly arranged to the shift lever 41. The sleeve 43 carries an arm 45 to which the inner end of the ribbon 42 is attached and whereby partial rotation of the sleeve will either extend or retract the ribbon. This assembly also contains a shell plate 46 which directs scooped fluid into a conduit 47 from where it enters a passage 48 in the stationary sleeve 6 and extending to the interior of the housing 4, the sleeve 36 being formed with a slot 49 underneath the opening of the conduit 47 to permit flow of fluid into the passage 48, the slot being so dimensioned and arranged to control the flow of fluid between the conduit 47 and passage 48 and vice versa dependent upon the rotated position of the sleeve 36 and the related position of the scoop ribbon 42.

The housings 4 and 5 encase the reverse coupling which comprises the vaned impeller assembly 24, a vaned runner assembly 50 and a set of stationary fluid guide blades 51 which are so directed that the runner assembly is rotated in the opposite direction to that of the driving impeller assembly, such runner assembly being an integral part of the sleeve 21 which is splined to the transmission shaft 20.

The reversible coupling, an illustrated incorporates suitable fluid seals, fluid venting and lubricating arrangements, the description of which is not necessary to herein describe as they are not an essential part of the invention.

*Operation*

When the coupling is operating in neutral, the scoop ribbon of the fluid scoop assembly 28 is fully extended and the scoop ribbons of the fluid scoop assemblies 29 and 30 fully retracted, as shown in Figs. 2, 3 and 4; the attached driving engine (not shown) rotating the impeller 14, the sleeve 25, the reversing impeller assembly 24, the fluid chamber 15 and the fluid reservoir 16, the fluid being in the form of a centrifugal fluid ring in the reservoir.

To shift to "ahead" drive the sleeve 36 is partially rotated through the medium of the manually actuated handle 41 and whereby the arms 37 and 38 radially extending from the sleeve 36, and to which the inner ends of the scoop ribbons are attached, swing from the positions shown in full lines towards the positions shown in dotted lines and whereby the scoop ribbon of the assembly 28 is retracted and the scoop ribbon of the assembly 29 advanced outwardly.

As the ribbon of the assembly 29 enters the centrifugal fluid ring in the reservoir 16 it immediately scoops fluid therefrom to eject it through the conduit 39 into the fluid chamber 15 and thence through orifices 52 into the impeller housing 14, the impeller blades 13 then rotating the turbine blades 10 of the runner 11 which is attached to the forward end of the transmission shaft 20, a forward drive is thus effected wherein the speed of the shaft in relation to the speed of the engine driven impeller 14 depends upon the volume of fluid admitted into the impeller and which is governed by the distance the scoop ribbon of the assembly 29 is advanced into the centrifugal fluid ring in the reservoir.

To shift from "ahead" to "reverse" or "astern" the coupling is first brought to "neutral" by partly rotating the sleeve 36 through the medium of the lever 41 to advance the ribbon in the assembly 28 and retract the ribbon in the assembly 29 and whereby the fluid in the impeller housing 14 is evacuated into the reservoir 16. To shift from "neutral" to "astern" the sleeve 43 is partially rotated through the medium of the shift lever 44 to advance the ribbon in the assembly 30 and thus evacuate fluid from the reservoir which passes through the passage 48 into the reverse coupling assembly contained within the housing 4 and 5 and where it is injected into the impeller assembly 24. As the housings 4 and 5 of the reverse coupling are formed with a peripheral passage 53 for the evacuation of fluid therefrom and which extends from the vicinity of the periphery of the runner assembly 50, to a conduit 54, Fig. 4, extending lengthwise of the sleeve 27 to communicate with the reservoir through ports 55 and 56, Fig. 5, in the sleeves 36 and 43, such ports are so positioned within the sleeves that they are out of register with the outlet opening of the conduit 54 while the reverse coupling is in operation. By this arrangement the volume of fluid in the reverse coupling is controlled and whereby the fluid contained in the coupling is impelled by the impeller 24, rotating in the same direction as the impeller 13, to pass across the fluid reverse flow guide plates 51 and thus rotate the runner 50 and the attached transmission shaft 20 in the reverse direction.

To evacuate the reverse coupling the sleeve 43 is partly rotated to retract the ribbon in the assembly 30, Fig. 4, and in which position the port 56 in the sleeve is in register with the port 55 in the sleeve 36 and which is in register with the outlet opening of the conduit 54. Immediately upon this setting the fluid in the reverse coupling evacuates through the passages 53 and 54 into the reservoir 16.

In full reverse the reverse coupling unit is full of fluid and as the sleeve 43 covers the outlet opening of the conduit 54 the unit remains full of fluid, the ribbon in the assembly 30 being fully advanced. If the shift lever 44 is moved away to a slight degree from the full reverse or astern position the partial rotation of the sleeve 36 will cause its port 55 to partly register with the fluid outlet opening of the conduit 54 and thus permit a controlled flow of fluid from the reverse unit. As this movement of the sleeve 36 partly retracts the ribbon in the assembly 30 a centrifugal fluid ring accumulates in the reservoir 16 and governed in volume by the position of the tip of the ribbon, this accumulated volume of fluid being withheld from the reverse unit with the resultant slowing down of the speed of the transmission shaft 20. The further the sleeve 36 is rotated the more its port 55 will register with the opening of the conduit 54 and the further the ribbon in the assembly 30 will be withdrawn with the result that more fluid will accumulate in the reservoir and the more slowly the transmission shaft will rotate. When the ribbon in the assembly is fully retracted the fluid in the reverse unit is immediately evacuated into the reservoir.

From the foregoing description, it will be apparent that by my construction an infinite range of forward and reverse speeds may be obtained without throttling or racing the engine and which is particularly desirable in marine drives; and although I have shown and described a particular embodiment of my invention, it is to be understood that I may make such changes and alterations as I may from time to time deem necessary without departing from the spirit of my invention as set forth in the appended claims.

What I claim as my invention is:

1. In a reversible fluid coupling, a rotatable driving element adapted for connection to a source of power, a driven transmission shaft, a forward drive coupling housing connected to the driving element to rotate therewith and in which a set of radial impeller vanes are mounted, a second set of impeller vanes connected to said forward drive coupling housing to rotate therewith, a reverse drive coupling housing in which the second set of blades are rotatably contained, a set of radial turbine vanes contained within the forward drive coupling housing and connected to the transmission shaft, a set of radial turbine vanes contained within the reverse drive coupling housing and also connected to the transmission shaft, a set of stationary radial fluid flow reversing vanes contained within the reverse drive coupling and interposed between the impeller vanes and the turbine vanes and under the fluid flow influence of which the turbine vanes are rotatable in the opposite direction to that of the impeller vanes, a forward drive coupling fluid chamber and a fluid reservoir both rotatable in unison with the forward drive coupling housing, an actuatable fluid scooping element contained within the forward drive coupling fluid chamber and by means of which a selected volume of fluid may be removed therefrom and ejected into the reservoir, two actuatable fluid scooping elements contained within the reservoir and by means of the first of the two elements a selected volume of fluid may be removed from the reservoir and ejected into the forward drive coupling chamber and by means of the second of the two elements a selected volume of fluid may be removed from the reservoir and ejected into the reverse drive coupling housing, the scooping element within the fluid coupling chamber and the first scooping element in the fluid reservoir being so arranged in actuatable relationship that when one element is scooping fluid the other is not, means for actuating said two fluid scoop elements, a fluid feeding conduit extending from the reservoir to the reverse drive coupling housing, a fluid return conduit extending from the reverse drive coupling housing to the reservoir, a valve operated by the means for actuating the second scooping element and controlling the passage of fluid in the return conduit from the reverse drive coupling housing to the reservoir and so arranged to operate in unison with the second scooping element that the extent of the closure is in ratio to the selected volume of fluid being injected into the reverse drive coupling housing.

2. A reversible fluid coupling as defined in claim 1, wherein the actuatable fluid scooping elements are in the form of fluid scooping ribbons slidably contained within tracks extending substantially radially to the transmission shaft of the coupling.

3. A reversible fluid coupling as defined in claim 1, wherein the forward drive coupling housing is connected to the second set of impeller vanes in the reverse drive coupling housing by a sleeve rotatably surrounding the transmission shaft and extending through the fluid reservoir and the fluid chamber.

4. A reversible fluid coupling as defined in claim 1, wherein the forward drive coupling housing is connected to the second set of impeller vanes in the reverse drive coupling housing by a sleeve rotatably surrounding the transmission shaft and extending through the fluid reservoir and the fluid chamber, and a stationary sleeve contained within the fluid reservoir and the fluid chamber to surround the rotatable sleeve and upon which the actuatable fluid scoop elements are mounted.

5. A reversible fluid coupling as defined in claim 1, wherein the forward drive coupling housing is connected to the second set of impeller vanes in the reverse drive coupling housing by a sleeve rotatably surrounding the transmission shaft and extending through the fluid reservoir and the fluid chamber, and a stationary sleeve contained within the fluid reservoir and the fluid chamber to surround the rotatable sleeve and upon which the actuatable fluid scoop elements are mounted, the actuatable fluid scooping elements being in the form of fluid scooping ribbons slidably contained within tracks and having their inner ends partly encircling the stationary sleeve and their outer ends curved and radiating from the sleeve.

6. A reversible fluid coupling as defined in claim 1, wherein the forward drive coupling housing is connected to the second set of impeller vanes in the reverse drive coupling housing by a sleeve rotatably surrounding the transmission shaft and extending through the fluid reservoir and the fluid chamber, and a stationary sleeve contained within the fluid reservoir and the fluid chamber to surround the rotatable sleeve and upon which the actuatable fluid scoop elements are mounted, the actuatable fluid scooping elements being in the form of fluid scooping ribbons slidably contained within tracks and having their inner ends partly encircling the stationary sleeve and their outer ends curved and radiating from the sleeve, and a fluid conduit extending between the scooping element in the forward drive coupling fluid chamber and the first of the two scooping elements in the fluid reservoir and through which ejected fluid passes from the chamber to the reservoir and vice versa.

7. A reversible fluid coupling as defined in claim 1, wherein the forward drive coupling housing is connected to the second set of impeller vanes in the reverse drive coupling housing by a sleeve rotatably surrounding the transmission shaft and extending through the fluid reservoir and the fluid chamber, and a stationary sleeve tained within the fluid reservoir and the fluid chamber to surround the rotatable sleeve and upon which the actuatable fluid scoop elements are mounted, the actuatable fluid scooping elements being in the form of fluid scooping ribbons slidably contained within tracks and having their inner ends partly encircling the stationary sleeve and their outer ends curved and radiating from the sleeve, a fluid conduit extending between the scooping element in the forward drive coupling fluid chamber and the first of the two scooping elements in the fluid reservoir and through which ejected fluid passes from the chamber to the reservoir and vice versa, and wherein the valve for controlling the passage of fluid in the return conduit from the reverse drive coupling housing to the reservoir is in the form of a rotatable sleeve encircling the stationary sleeve and having a port therein arranged to move across the outlet end of the conduit, the fluid scooping ribbon in the second of the two fluid scooping elements in the fluid reservoir being attached to said rotatable sleeve for movement in unison therewith.

8. A reversible fluid coupling as defined in claim 1, wherein the forward drive coupling housing is connected to the second set of impeller vanes in the reverse drive coupling housing by a sleeve rotatably surrounding the transmission shaft and extending through the fluid reservoir and the fluid chamber, the actuatable fluid scooping elements being in the form of fluid scooping ribbons slidably contained within tracks extending substantially radially to the transmission shaft of the coupling, and a plurality of concentrically mounted manually moveable sleeves surrounding the transmission shaft and to which the fluid scooping ribbons are attached to move in unison with the sleeves.

References Cited in the file of this patent

UNITED STATES PATENTS

| | | |
|---|---|---|
| 2,187,667 | Sinclair et al. | Jan. 16, 1940 |
| 2,492,456 | Becker | Dec. 27, 1949 |
| 2,622,712 | Becker | Dec. 23, 1952 |
| 2,627,167 | Becker | Feb. 3, 1953 |
| 2,651,917 | Yates | Sept. 15, 1953 |